(12) United States Patent
Waters

(10) Patent No.: US 7,522,925 B2
(45) Date of Patent: Apr. 21, 2009

(54) FINDING LOCALLY-RELEVANT INFORMATION IN A DOCUMENT

(75) Inventor: John Deryk Waters, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1976 days.

(21) Appl. No.: 09/862,185

(22) Filed: May 21, 2001

(65) Prior Publication Data

US 2002/0004412 A1    Jan. 10, 2002

(30) Foreign Application Priority Data

May 26, 2000    (GB) ................................ 0012749.8

(51) Int. Cl.
*H04Q 7/20* (2006.01)
(52) U.S. Cl. ............... 455/456.1; 455/414.1; 455/456.3
(58) Field of Classification Search ............. 455/412.1, 455/414.1, 456.1, 456.3, 456.4
See application file for complete search history.

(56) References Cited

U.S. PATENT DOCUMENTS

| | | | |
|---|---|---|---|
| 5,329,576 A | 7/1994 | Handforth .................... 379/59 |
| 5,375,161 A | 12/1994 | Fuller et al. .................... 379/57 |
| 5,432,841 A | 7/1995 | Rimer .......................... 379/59 |
| 5,432,842 A | 7/1995 | Kinoshita et al. ............. 379/60 |
| 5,532,690 A | 7/1996 | Hertel ......................... 340/989 |
| 5,555,376 A | 9/1996 | Theimer et al. ........ 395/200.09 |
| 5,561,704 A | 10/1996 | Salimando .................... 379/58 |
| 5,598,166 A | 1/1997 | Ishikawa et al. ............. 342/357 |
| 5,724,660 A | 3/1998 | Kauser et al. ................ 455/456 |
| 5,774,829 A | 6/1998 | Cisneros et al. .............. 701/213 |
| 5,790,074 A | 8/1998 | Rangedahl et al. .......... 342/357 |
| 5,850,609 A | 12/1998 | Sugarbroad et al. ......... 455/456 |
| 5,922,073 A | 7/1999 | Shimada ..................... 713/200 |
| 5,999,126 A | 12/1999 | Ito ........................... 342/357.1 |
| 6,055,434 A | 4/2000 | Seraj ........................... 455/456 |
| 6,067,007 A | 5/2000 | Gioia .......................... 340/426 |
| 6,119,012 A | 9/2000 | Amirijoo ..................... 455/456 |
| 6,167,274 A | 12/2000 | Smith .......................... 455/456 |
| 6,173,180 B1 | 1/2001 | Hussain et al. .............. 455/433 |
| 6,211,818 B1 | 4/2001 | Zach, Sr. ............... 342/357.07 |
| 6,223,044 B1 | 4/2001 | Schultz ....................... 455/456 |
| 6,275,707 B1 | 8/2001 | Reed et al. .................. 455/456 |
| 6,356,761 B1 * | 3/2002 | Huttunen et al. ......... 455/456.1 |
| 6,370,629 B1 * | 4/2002 | Hastings et al. ............. 711/163 |
| 6,377,791 B1 | 4/2002 | Pirila ......................... 455/410 |
| 6,415,155 B1 | 7/2002 | Koshima et al. ............ 455/456 |
| 6,456,852 B2 * | 9/2002 | Bar et al. ................. 455/456.1 |
| 6,462,656 B2 | 10/2002 | Ulrich et al. ................ 340/539 |
| 6,466,938 B1 | 10/2002 | Goldberg .................... 707/100 |

(Continued)

FOREIGN PATENT DOCUMENTS

CA          2255349          6/1999

(Continued)

*Primary Examiner*—Sujatha Sharma

(57) ABSTRACT

In order to find locally relevant information in a physical or electronic document (71), such as a guide book, which a user (70) already possesses, the user contacts a service system (40) over a mobile radio infrastructure (10). The service system (40) is provided both with the identity of the document and the location of the user. The service system (40) accesses a database (44) that correlates location to a document reference, such as a page number, where relevant information can be found in the document (71). The document reference is returned to the user (70).

21 Claims, 5 Drawing Sheets

U.S. PATENT DOCUMENTS

| | | | |
|---|---|---|---|
| 6,539,200 B1 | 3/2003 | Schiff | 455/12.1 |
| 6,549,625 B1 * | 4/2003 | Rautila et al. | 380/258 |
| 6,594,666 B1 * | 7/2003 | Biswas et al. | 707/100 |
| 6,603,977 B1 | 8/2003 | Walsh et al. | 455/456 |
| 6,624,754 B1 | 9/2003 | Hoffman et al. | 340/573.1 |
| 6,625,457 B1 | 9/2003 | Raith | 455/456.1 |
| 6,633,877 B1 * | 10/2003 | Saigh et al. | 707/10 |
| 6,636,742 B1 | 10/2003 | Torkki et al. | 455/456 |
| 6,636,894 B1 * | 10/2003 | Short et al. | 709/225 |
| 6,650,284 B1 | 11/2003 | Mannings et al. | 342/357.09 |
| 6,662,108 B2 | 12/2003 | Miller et al. | 701/301 |
| 6,675,014 B1 | 1/2004 | Sundquist | 455/435.1 |
| 6,677,894 B2 * | 1/2004 | Sheynblat et al. | 342/357.1 |
| 2001/0055976 A1 | 12/2001 | Crouch et al. | 455/456 |
| 2002/0013153 A1 | 1/2002 | Wilcock et al. | 455/456 |
| 2002/0055361 A1 | 5/2002 | McDonnell et al. | 455/456 |

FOREIGN PATENT DOCUMENTS

| | | |
|---|---|---|
| EP | 0 703 463 A2 | 3/1996 |
| EP | 0 785 535 A1 | 7/1997 |
| EP | 0 874 529 A2 | 10/1998 |
| EP | 0 973 351 A1 | 1/2000 |
| GB | 2 305 285 | 4/1997 |
| GB | 2 325 592 A | 11/1998 |
| GB | 2 334 859 A | 9/1999 |
| GB | 2339356 A | 1/2000 |
| GB | 2 348 573 A | 10/2000 |
| JP | 10103977 | 4/1998 |
| JP | 11027733 | 1/1999 |
| WO | 94/26567 | 11/1994 |
| WO | WO 98/25433 | 6/1998 |
| WO | WO 98/52379 | 11/1998 |
| WO | WO 98/57506 | 12/1998 |
| WO | WO 98/59506 | 12/1998 |
| WO | WO 00/19743 | 4/2000 |
| WO | WO 00/30379 | 5/2000 |

* cited by examiner

FINDING LOCALLY-RELEVANT INFORMATION IN A DOCUMENT

CROSS-REFERENCE TO RELATED APPLICATIONS

This application is related to U.S. patent application Ser. No. 09/858,146 filed on May 15, 2001 for "Obtaining Location Updates About a Mobile Entity for Use in a Location-Sensitive Application". This application is further related to U.S. patent application Ser. No. 09/858,148 filed on May 15, 2001 for "Retrieval of Location-Related Information".

FIELD OF THE INVENTION

The present invention relates to location aware mobile services and more particularly to a method and system for finding locally-relevant information in a physical or electronic document already possessed by a user.

BACKGROUND OF THE INVENTION

Communication infrastructures suitable for mobile users (in particular, though not exclusively, cellular radio infrastructures) have now become widely adopted. Whilst the primary driver has been mobile telephony, the desire to implement mobile data-based services over these infrastructures, has led to the rapid development of data-capable bearer services across such infrastructures. This has opened up the possibility of many Internet-based services being available to mobile users.

By way of example, FIG. 1 shows one form of known communication infrastructure for mobile users providing both telephony and data-bearer services. In this example, a mobile entity 20, provided with a radio subsystem 22 and a phone subsystem 23, communicates with the fixed infrastructure of GSM PLMN (Public Land Mobile Network) 10 to provide basic voice telephony services. In addition, the mobile entity 20 includes a data-handling subsystem 25 interworking, via data interface 24, with the radio subsystem 22 for the transmission and reception of data over a data-capable bearer service provided by the PLMN; the data-capable bearer service enables the mobile entity 20 to communicate with a service system 40 connected to the public Internet 39. The data handling subsystem 25 supports an operating environment 26 in which applications run, the operating environment including an appropriate communications stack.

More particularly, the fixed infrastructure 10 of the GSM PLMN comprises one or more Base Station Subsystems (BSS) 11 and a Network and Switching Subsystem NSS 12. Each BSS 11 comprises a Base Station Controller (BSC) 14 controlling multiple Base Transceiver Stations (BTS) 13 each associated with a respective "cell" of the radio network. When active, the radio subsystem 22 of the mobile entity 20 communicates via a radio link with the BTS 13 of the cell in which the mobile entity is currently located. As regards the NSS 12, this comprises one or more Mobile Switching Centers (MSC) 15 together with other elements such as Visitor Location Registers 32 and Home Location Register 32.

When the mobile entity 20 is used to make a normal telephone call, a traffic circuit for carrying digitised voice is set up through the relevant BSS 11 to the NSS 12 which is then responsible for routing the call to the target phone (whether in the same PLMN or in another network).

With respect to data transmission to/from the mobile entity 20, in the present example three different data-capable bearer services are depicted though other possibilities exist. A first data-capable bearer service is available in the form of a Circuit Switched Data (CSD) service; in this case a full traffic circuit is used for carrying data and the MSC 32 routes the circuit to an InterWorking Function IWF 34 the precise nature of which depends on what is connected to the other side of the IWF. Thus, IWF could be configured to provide direct access to the public Internet 39 (that is, provide functionality similar to an IAP—Internet Access Provider IAP). Alternatively, the IWF could simply be a modem connecting to a PSTN; in this case, Internet access can be achieved by connection across the PSTN to a standard IAP.

A second, low bandwidth, data-capable bearer service is available through use of the Short Message Service that passes data carried in signalling channel slots to an SMS unit which can be arranged to provide connectivity to the public Internet 39.

A third data-capable bearer service is provided in the form of GPRS (General Packet Radio Service which enables IP (or X.25) packet data to be passed from the data handling system of the mobile entity 20, via the data interface 24, radio subsystem 21 and relevant BSS 11, to a GPRS network 17 of the PLMN 10 (and vice versa). The GPRS network 17 includes a SGSN (Serving GPRS Support Node) 18 interfacing BSC 14 with the network 17, and a GGSN (Gateway GPRS Support Node) interfacing the network 17 with an external network (in this example, the public Internet 39). Full details of GPRS can be found in the ETSI (European Telecommunications Standards Institute) GSM 03.60 specification. Using GPRS, the mobile entity 20 can exchange packet data via the BSS 11 and GPRS network 17 with entities connected to the public Internet 39.

The data connection between the PLMN 10 and the Internet 39 will generally be through a firewall 35 with proxy and/or gateway functionality.

Different data-capable bearer services to those described above may be provided, the described services being simply examples of what is possible.

In FIG. 1, a service system 40 is shown connected to the Internet 40, this service system being accessible to the OS/application 26 running in the mobile entity by use of any of the data-capable bearer services described above. The data-capable bearer services could equally provide access to a service system that is within the domain of the PLMN operator or is connected to another public or private data network.

With regard to the OS/application software 26 running in the data handling subsystem 25 of the mobile entity 20, this could, for example, be a WAP application running on top of a WAP stack where "WAP" is the Wireless Application Protocol standard. Details of WAP can be found, for example, in the book "Official Wireless Application Protocol" Wireless Application Protocol Forum, Ltd published 1999 Wiley Computer Publishing. Where the OS/application software is WAP compliant, the firewall will generally also serve as a WAP proxy and gateway. Of course, OS/application 26 can comprise other functionality (for example, an e-mail client) instead of, or additional to, the WAP functionality.

The mobile entity 20 may take many different forms. For example, it could be two separate units such as a mobile phone (providing elements 22-24) and a mobile PC (data-handling system 25) coupled by an appropriate link (wireline, infrared or even short range radio system such as Bluetooth). Alternatively, mobile entity 20 could be a single unit such as a mobile phone with WAP functionality. Of course, if only data transmission/reception is required (and not voice), the phone functionality 24 can be omitted; an example of this is a PDA with built-in GSM data-capable functionality whilst another example is a digital camera (the data-handling subsystem) also with built-in GSM data-capable functionality enabling the upload of digital images from the camera to a storage server.

Whilst the above description has been given with reference to a PLMN based on GSM technology, it will be appreciated that many other cellular radio technologies exist and can typically provide the same type of functionality as described for the GSM PLMN 10.

Recently, much interest has been shown in "location-based", "location-dependent", or "location-aware" services for mobile users, these being services that take account of the current location of the user (or other mobile party). The most basic form of this service is the emergency location service whereby a user in trouble can press a panic button on their mobile phone to send an emergency request-for-assistance message with their location data appended. Another well known location-based service is the provision of traffic and route-guiding information to vehicle drivers based on their current position. A further known service is a "yellow pages" service where a user can find out about amenities (shops, restaurants, theatres, etc.) local to their current location. The term "location-aware services" will be used herein to refer generically to these and similar services where a location dependency exists.

Location-aware services all require user location as an input parameter. A number of methods already exist for determining the location of a mobile user as represented by an associated mobile equipment. Example location-determining methods will now be described with reference to FIGS. 2 to 5. As will be seen, some of these methods result in the user knowing their location thereby enabling them to transmit it to a location-aware service they are interested in receiving, whilst other of the methods result in the user's location becoming known to a network entity from where it can be supplied directly to a location-aware service (generally only with the consent of the user concerned). It is to be understood that additional methods to those illustrated in FIGS. 2 to 5 exist.

As well as location determination, FIGS. 2 to 5 also illustrate how the mobile entity requests a location-aware service provided by service system 40. In the present examples, the request is depicted as being passed over a cellular mobile network (PLMN 10) to the service system 40. The PLMN is, for example, similar to that depicted in FIG. 1 with the service request being made using a data-capable bearer service of the PLMN. The service system 40 may be part of the PLMN itself or connected to it through a data network such as the public Internet. It should, however, be understood that infrastructure other than a cellular network may alternatively be used for making the service request The location-determining method illustrated in FIG. 2 uses an inertial positioning system 50 provided in the mobile entity 20A, this system 50 determining the displacement of the mobile entity from an initial reference position. When the mobile entity 20A wishes to invoke a location-aware service, it passes its current position to the corresponding service system 40 along with the service request 51. This approach avoids the need for an infrastructure to provide an external frame of reference; however, cost, size and long-term accuracy concerns currently make such systems unattractive for incorporation into mass-market handheld devices.

FIG. 3 shows two different location-determining methods both involving the use of local, fixed-position, beacons here shown as infra-red beacons IRD though other technologies, such as short-range radio systems (in particular, "Bluetooth" systems) may equally be used. The right hand half of FIG. 3 show a number of independent beacons 55 that continually transmit their individual locations. Mobile entity 20B is arranged to pick up the transmissions from a beacon when sufficiently close, thereby establishing its position to the accuracy of its range of reception. This location data can then be appended to a request 59 made by the mobile entity 20B to a location-aware service available from service system 40. A variation on this arrangement is for the beacons 55 to transmit information which whilst not directly location data, can be used to look up such data (for example, the data may be the Internet home page URL of a store housing the beacon 55 concerned, this home page giving the store location—or at least identity, thereby enabling look-up of location in a directory service).

In the left-hand half of FIG. 3, the IRB beacons 54 are all connected to a network that connects to a location server 57. The beacons 54 transmit a presence signal and when mobile entity 20C is sufficiently close to a beacon to pick up the presence signal, it responds by sending its identity to the beacon. (Thus, in this embodiment, both the beacons 54 and mobile entity 20C can both receive and transmit IR signals whereas beacons 55 only transmit, and mobile entity 20B only receives, IR signals). Upon a beacon 54 receiving a mobile entity's identity, it sends out a message over network 56 to location server 57, this message linking the identity of the mobile entity 20C to the location of the relevant beacon 54. Now when the mobile entity wishes to invoke a location-aware service provided by the service system 40, since it does not know its location it must include it's identity in the service request 58 and rely on the service system 40 to look up the current location of the mobile entity in the location server 57. Because location data is personal and potentially very sensitive, the location server 57 will generally only supply location data to the service system 40 after the latter has produced an authorizing token supplied by the mobile entity 20B in request 58. It will be appreciated that whilst service system 40 is depicted as handling service requests form both types of mobile entity 20B and 20C, separate systems 40 may be provided for each mobile type (this is likewise true in respect of the service systems depicted in FIGS. 4 and 5).

FIG. 4 depicts several forms of GPS location-determining system. On the left-hand side of FIG. 4, a mobile entity 20D is provided with a standard GPS module and is capable of determining the location of entity 20D by picking up signals from satellites 60. The entity 20D can then supply this location when requesting, in request 61, a location-aware service from service system 40.

The right-hand side of FIG. 4 depicts, in relation to mobile entity 20E, two ways in which assistance can be provided to the entity in deriving location from GPS satellites. Firstly, the PLMN 10 can be provided with fixed GPS receivers 62 that each continuously keep track of the satellites 60 visible from the receiver and pass information in messages 63 to local mobile entities 20E as to where to look for these satellites and estimated signal arrival times; this enables the mobile entities 20E to substantially reduce acquisition time for the satellites and increase accuracy of measurement (see "Geolocation Technology Pinpoints Wireless 911 calls within 15 Feet" 1 Jul. 1999 Lucent Technologies, Bell Labs). Secondly, as an alternative enhancement, the processing load on the mobile entity 20E can be reduced and encoded jitter removed using the services of network entity 64 (in or accessible through PLMN 10).

One the mobile unit 20E has determined its location, it can pass this information in request 65 when invoking a location-aware service provided by service system 40.

FIG. 5 depicts two general approaches to location determination from signals present in a cellular radio infrastructure.

First, it can be noted that in general both the mobile entity and the network will know the identity of the cell in which the mobile entity currently resides, this information being provided as part of the normal operation of the system. (Although in a system such as GSM, the network may only store current location to a resolution of a collection of cells known as a "location area", the actual current cell ID will generally be derivable from monitoring the signals exchanged between the BSC 14 and the mobile entity). Beyond current basic cell ID, it is possible to get a more accurate fix by measuring timing and/or directional parameters between the mobile entity and multiple BTSs 13, these measurement being done either in the network or the mobile entity (see, for example, International Application WO 99/04582 that describes various techniques for effecting location determination in the mobile and WO 99/55114 that describes location determination by the mobile network in response to requests made by location-aware applications to a mobile location center—server—of the mobile network).

The left-hand half of FIG. 5 depicts the case of location determination being done in the mobile entity 20F by, for example, making Observed Time Difference (OTD) measurements with respect to signals from BTSs 13 and calculating location using a knowledge of BTS locations. The location data is subsequently appended to a service request 66 sent to service system 40 in respect of a location-aware service. The calculation load on mobile entity 20F could be reduced and the need for the mobile to know BTS locations avoided, by having a network entity do some of the work. The right-hand half of FIG. 5 depicts the case of location determination being done in the network, for example, by making Timing Advance measurements for three BTSs 13 and using these measurements to derive location (this derivation typically being done in a unit associated with BSC 14). The resultant location data is passed to a location server 67 from where it can be made available to authorised services. As for the mobile entity 20C in FIG. 3, when the mobile entity 20G of FIG. 5 wishes to invoke a location-aware service available on service system 50, it sends a request 69 including an authorisation token and its ID (possible embedded in the token) to the service system 40; the service system then uses the authorisation token to obtain the current location of the mobile entity 20G from the location server 67.

In the above examples, where the mobile entity is responsible for determining location, this will generally be done only at the time the location-aware service is being requested. Where location determination is done by the infrastructure, it may be practical for systems covering only a limited number of users (such as the system illustrated in the left-hand half of FIG. 2 where a number of infrared beacons 54 will cover a generally fairly limited) for location-data collection to be done whenever a mobile entity is newly detected by an IRB, this data being passed to location server 57 where it is cached for use when needed. However, for systems covering large areas with potentially a large number of mobile entities, such as the FIG. 5 system, it is more efficient to effect location determination as and when there is a perceived need to do so; thus, location determination may be triggered by the location server 67 in response to the service request 68 from the mobile entity 20G or the mobile entity may, immediately prior to making request 68, directly trigger BSC 14 to effect a location determination and feed the result to location server 67.

Further with respect to the location servers 57, 67, whilst access authorisation by location-aware services has been described as being through authorisation tokens supplied by the mobile entities concerned, other authorisation techniques can be used. In particular, a location-aware service can be prior authorised with the location server in respect of particular mobile entities; in this case, each request from the service for location data needs only to establish that the request comes from a service authorised in respect of the mobile entity for which the location data is requested.

As already indicated, FIGS. 2 to 5 depict only some examples of how location determination can be achieved, there being many other possible combinations of technology used and where in the system the location-determining measurements are made and location is calculated, stored and used Thus, the location-aware service may reside in the mobile entity whose location is of interest, in a network-connected service system 40 (as illustrated), or even in another mobile entity. Furthermore, whilst in the examples of FIGS. 2 to 5, invocation of the location-aware service has been by the mobile entity whose location is of interest, the nature of the location-aware service may be such that it is invoked by another party (including, potentially, the PLMN itself). In this case, unless the invoking party already knows the location of the mobile entity and can pass this information to the location-aware service (which may, for example, may be situation where the PLMN invokes the service), it is the location-aware service that is responsible for obtaining the required location data, either by sending a request to the mobile entity itself or by requesting the data from a location server. Unless the location server already has the needed information in cache, the server proceeds to obtain the data either by interrogating the mobile entity or by triggering infrastructure elements to locate the mobile. For example, where a location-aware service running on service system 40 in FIG. 5 needs to find the location of mobile 20G, it could be arranged to do so by requesting this information from location server 67 which in turn requests the location data from the relevant BSC, the latter then making the necessary determination using measurements from BTSs 13.

Although in the foregoing, the provision of location data through the mobile radio infrastructure to the mobile entity has been treated as a service effected over a data-capable bearer channel, it may be expected that as location data becomes considered a basic element of mobile radio infrastructure services, provision will be made in the relevant mobile radio standards for location data to be passed over a signalling channel to the mobile entity.

As noted above, a number of location-aware services already exist for returning location-related information to the user of a mobile entity in response to a query made by the user. However, by their very nature, mobile devices cannot compete with printed books, such as guide books, in terms of ease of use and quality of presentation. It can be expected therefore, that guidebooks and the like will survive and continue to flourish despite the increasing availability of locally-relevant information provided over mobile devices such as WAP-enabled cell phones.

It is an object of the present invention to provide synergistic interaction between physical and electronic guidebooks and location-aware service systems accessible via the mobile radio infrastructure.

SUMMARY OF THE INVENTION

According to one aspect of the present invention, there is provided a method of finding locally-relevant information in a physical or electronic document already possessed by a user, the method involving the steps of:

(a)—sending a query message from a mobile entity associated with the user via a mobile radio infrastructure to a service system, the query message identifying the document to the system;

(b)—providing location data regarding the location of the mobile entity to the service system;

(c)—under the control of the service system, obtaining a document reference to information in the document relevant to the locality of the mobile entity as indicated by said location data;

(d)—returning the document reference to the mobile entity.

According to another aspect of the present invention, there is provided a

BRIEF DESCRIPTION OF THE DRAWINGS

A method and service-system, both embodying the present invention, for finding locally-relevant information in a physical or electronic document, will now be described, by way of non-limiting example, with reference to the accompanying diagrammatic drawings, in which.

BEST MODE OF CARRYING OUT THE INVENTION

The service system and method embodying the invention, for finding locally-relevant information in a document, will now be described with reference to FIG. 6 which shows the service system 40 as connected to the public Internet 39. It is to be understood that the present invention is not limited to the specifics of the mobile entity, location discovery means, and communication infrastructure shown in FIG. 6 and the generalisations discussed above in relation to FIGS. 1 to 5 regarding these elements apply equally to the operational context of the service system 40. Furthermore, whilst the service system 40 is shown as connected to the public Internet, it could be connected to the GPRS network 17 or to another fixed data network interfacing directly or indirectly with the network 17 or network 39.

Figure 1:
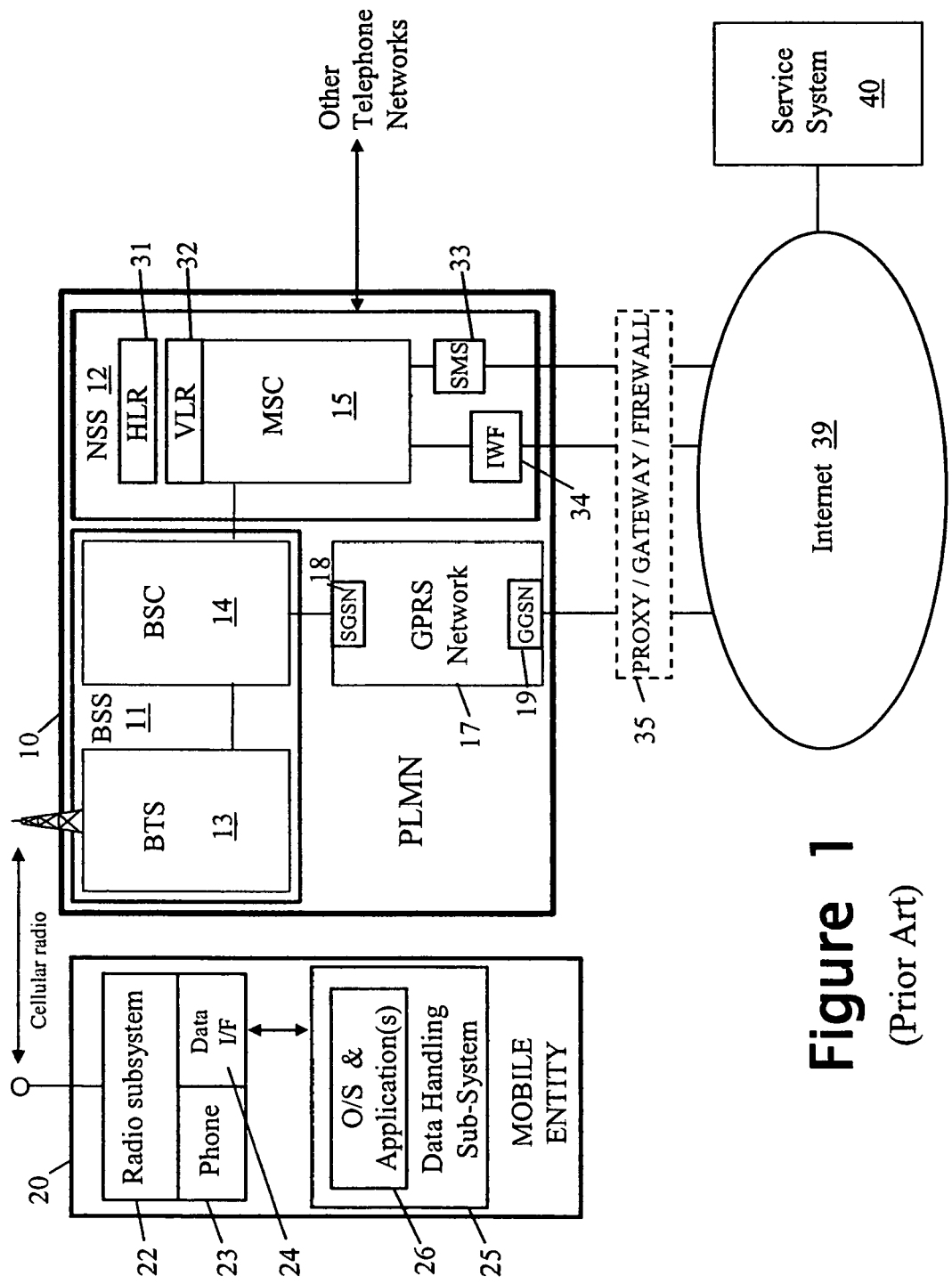
FIG. 1 is a diagram of a known communications infrastructure usable for transferring voice and data to/from a mobile entity.
Figure 2:
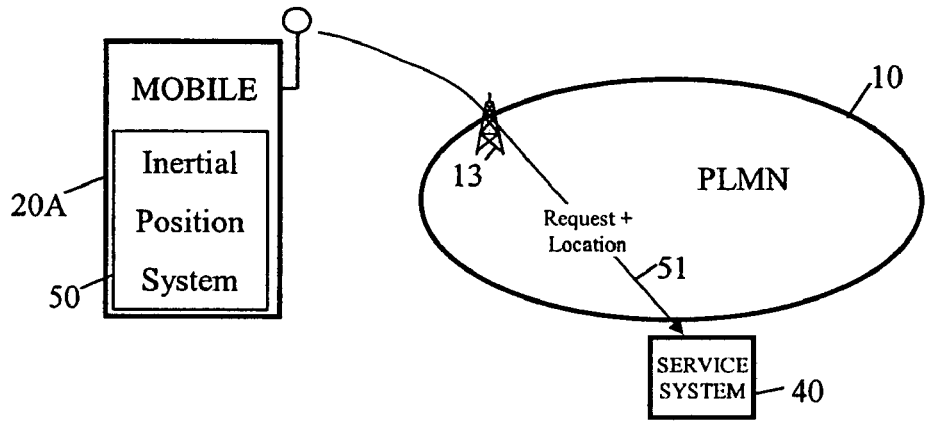
FIG. 2 is a diagram illustrating one known approach to determining the location of a mobile entity, this approach involving providing the entity with an inertial positioning system.
Figure 3:
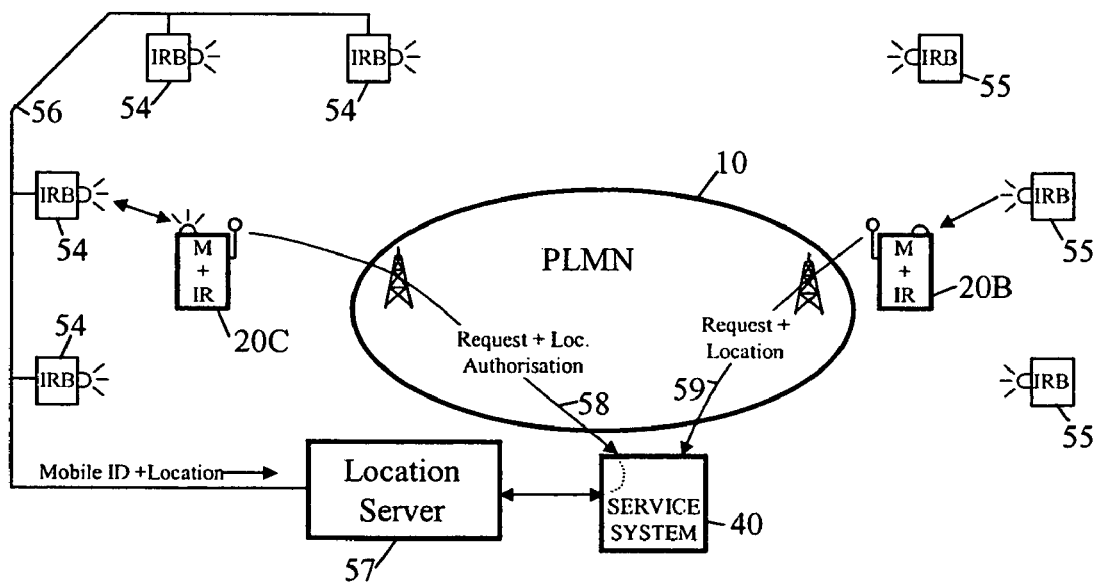
FIG. 3 is a diagram illustrating another known approach to determining the location of a mobile entity, this approach being based on proximity of the mobile entity to fixed-position local beacons.
Figure 4:
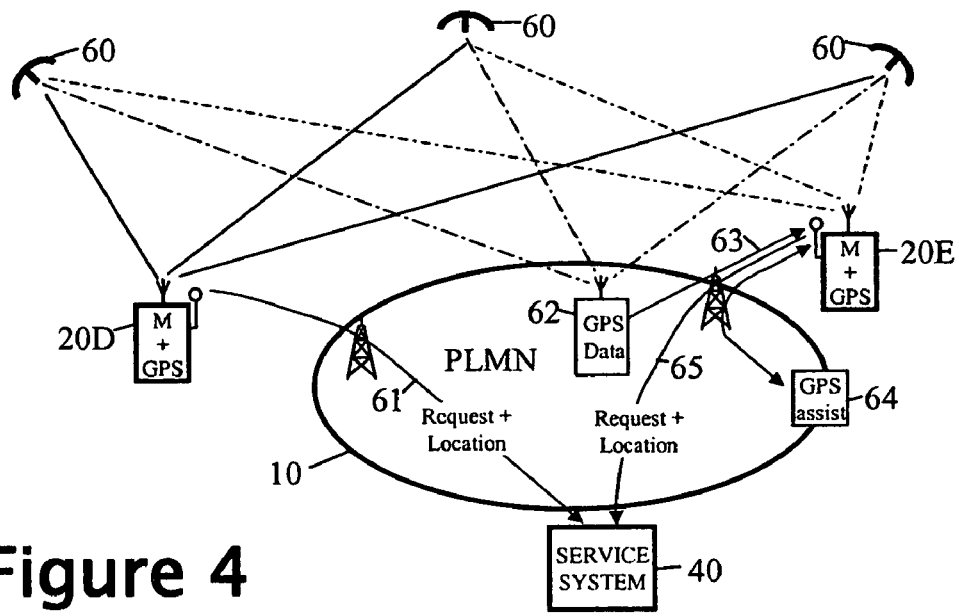
FIG. 4 is a diagram illustrating a further known approach to determining the location of a mobile entity, this approach involving the use of GPS satellites.
Figure 5:
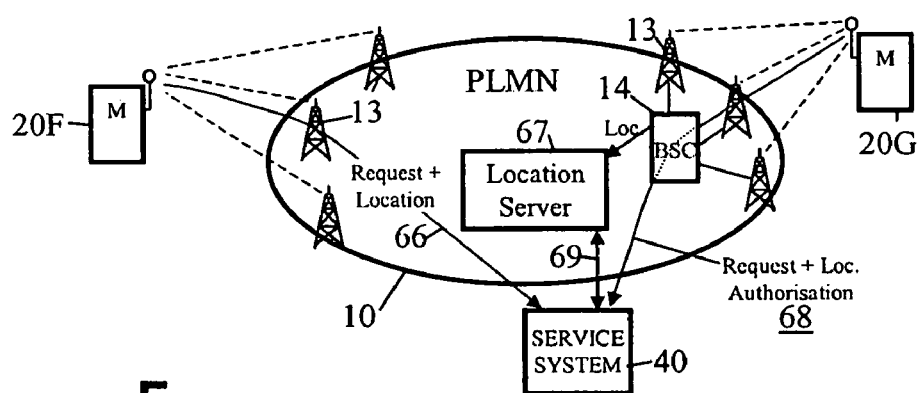
FIG. 5 is a diagram illustrating a still further approach to determining the location of a mobile entity, this approach being based on the use of signals present in a cellular mobile radio communications system.
Figure 6:
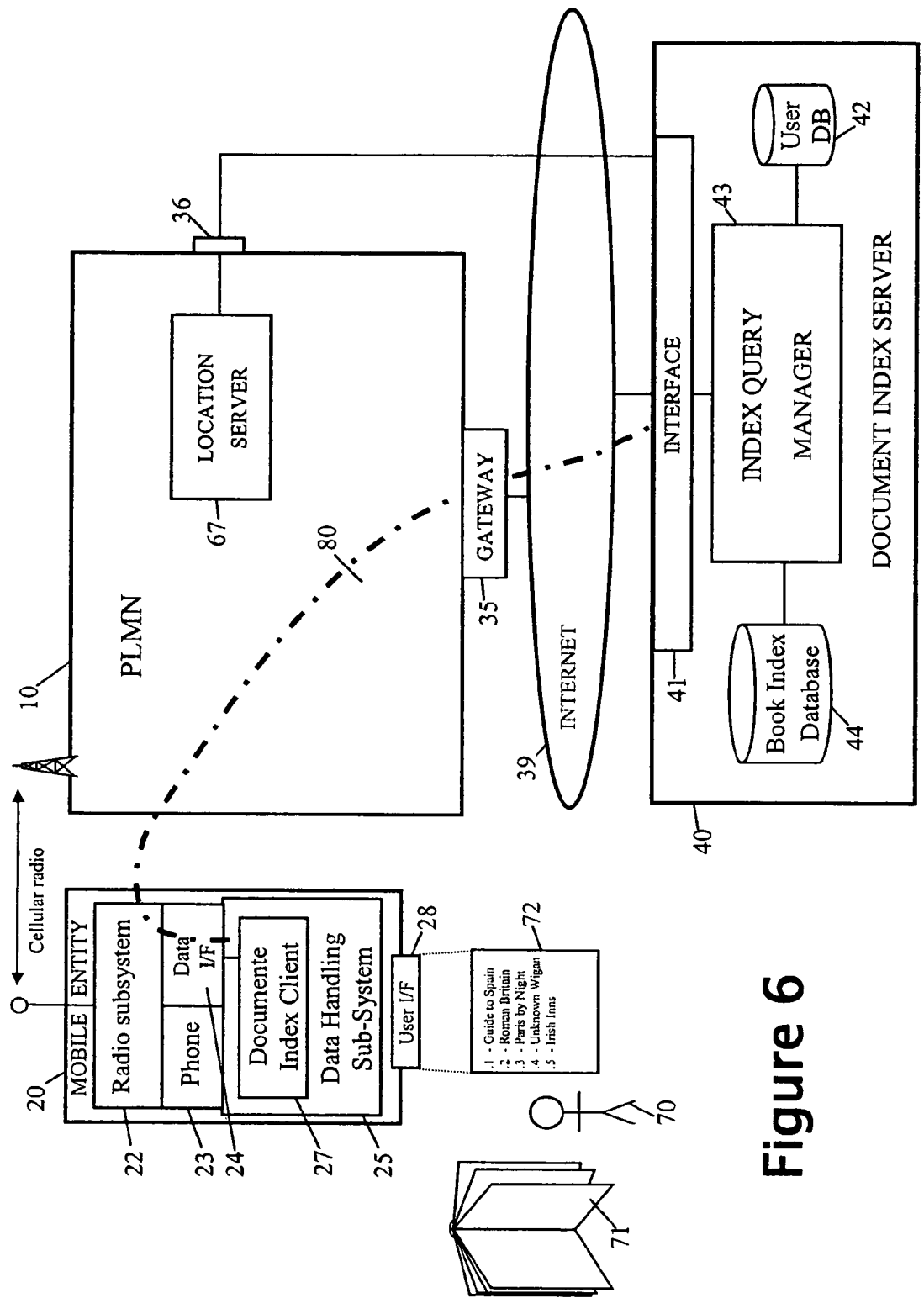
FIG. 6 is a diagram illustrating the method and service system embodying the present invention.

In the FIG. 6 embodiment, a user 70 has a physical guide book 71 and a mobile device 20 that includes a data-handling subsystem 25. By using user interface 28, the user can run a document-index client application 27 (for example, a WAP application) which assists the user in finding a page in the guide book 71 relevant to the user's current location.

More particularly, the document-index application 27, when run, first presents the user with a list of books (or other documents) which the user has previously input into the device 20 through interface 28; each list entry identifies the book by name and ISBN (International Standard Book Number). The user selects the guide book 70 from the list 72 and tells the application to continue. The application 27 now composes a query message including a user ID and the ISBN of the book 70, and sends it to a document-index service system 40 via a data-capable bearer service of PLMN 10, gateway 35, and internet 39 (see chain-dashed line 80).

The query message is received at interface 41 of the service system and passed to a query manager 43. The query manager first checks that the query is from a registered user by referring to user database 42. Assuming the user is registered, query manager 43 next obtains the current location of the user 70 from a location server 67 of PLMN via PLMN interface 36, the server system 40 being pre-authorised to obtain this information from the location server 67 in respect of user 70.

The query manager 43 then refers to database 44 that holds for each of a plurality of documents, a mapping between location and document reference data, this latter indicating where in the document one can find information relevant to a specified location. The document reference data is, for example, in the form of page (and possibly line) numbers. In the present case, the mapping relevant to book 70 (as identified by the ISBN contained in the query message) is accessed and the document reference relevant to the user's ascertained location is retrieved. This document reference is returned by database 44 to the query manager 43 which passes it back to the mobile device 20 where it is displayed to the user. User 70 can now turn to the indicated page of guide book 70 knowing that this is the page relevant to the user's current location.

Instead of database 44 directly mapping user location to document reference for the document concerned, the mapping can be effected in two stages. First the user location is mapped to a set of one or more elements related to that location—these elements might, for example, be the names of nearby towns and villages, historical events and persons associated with the locality, names of recommended restaurants, etc. This initial mapping is preferably document independent and used for every document logged in database 44. The elements of the set generated by this initial mapping are then used as search keys for ascertaining the location of relevant information in the document of interest; thus, in one implementation, an electronic version of the document of interest is stored in database 44 and is scanned for matches with the elements retrieved by the initial mapping. For each element associated with the user's location, the database 44 returns to query manager 43 the document reference or references of the match or matches found in the document for that element. Query manager 43 then passes one or more of these document references, together with the corresponding element, back to the user 70 via PLMN 10.

Figure 7:
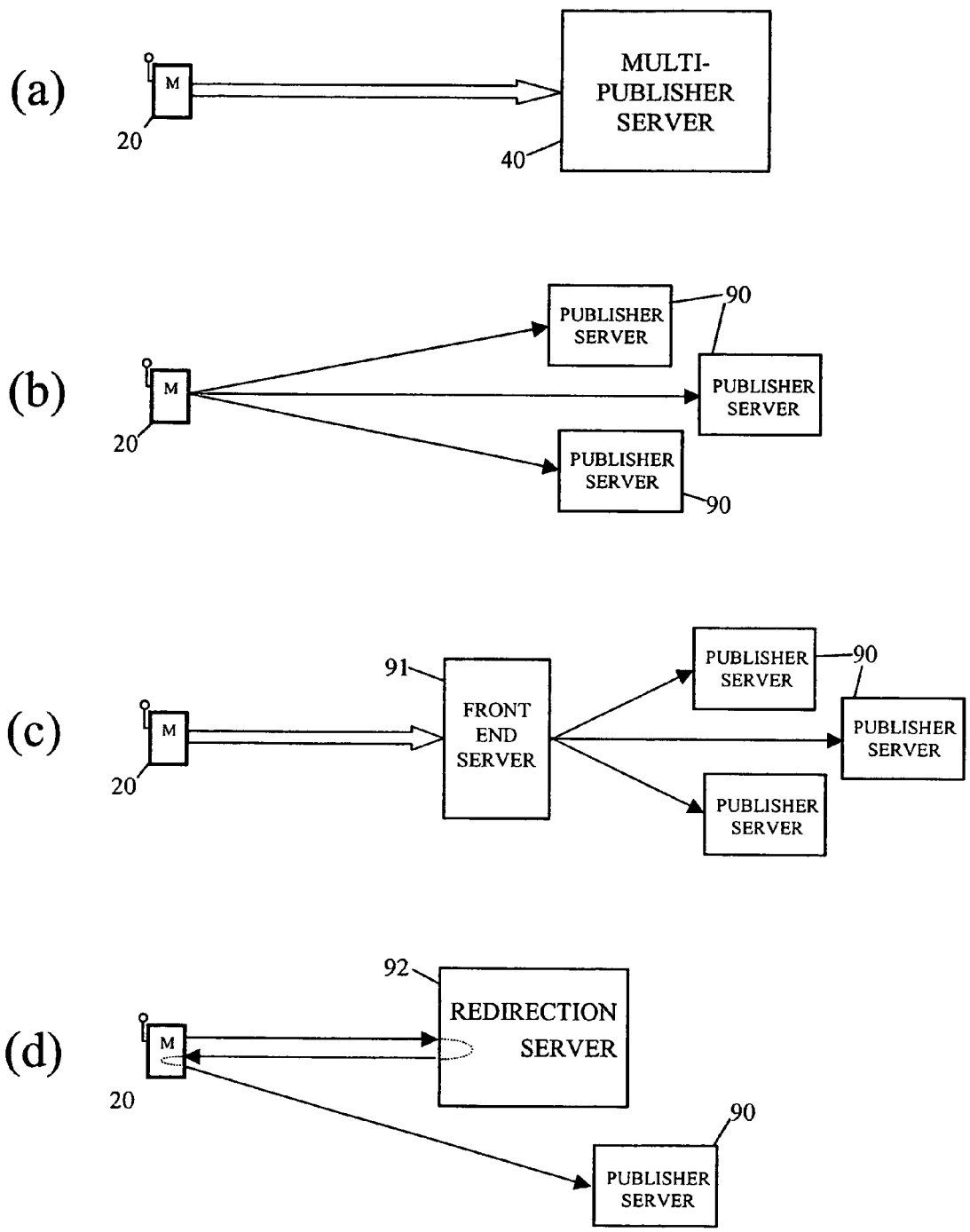
FIG. 7 is a diagram illustrating four different arrangements, respectively labeled (a), (b), (c) and (d), for organizing and accessing document-reference information for documents associated with different publishers.

The advantage of the arrangement described in the foregoing paragraph is that it enables any document available in electronic form to be readily reviewed for locally-relevant information without the need to produce a specific mapping of location to local information for the book concerned. Of course, it would also be possible to produce in advance, from a search of a particular document, a mapping between all elements in a document and document references; this mapping would then be used when identifying the document references corresponding to the elements associated with user's current location FIG. 7 depicts several different arrangements of the document index service adapted to deal with documents coming from different publishers. The arrangement shown in FIG. 7(a) corresponds to that of the FIG. 6 embodiment where a single document-index service system 40 is adapted to handle documents from several publishers—in other words, database 44 holds document-reference data on documents from multiple publishers, and all queries are sent to the same service destination. In contrast, in the FIG. 7(b) arrangement, each publisher has its own document-index service system 90 and the document-index client 27 running in mobile device 20 is responsible for sending the query to the correct service system (one way of doing this is to store, for each entry in list 72, the address—e.g. a URL—of the publisher service system to be contacted).

The arrangement shown in FIG. 7(c) is effectively a synthesis of the arrangements of FIGS. 7(a) and (b) with the device needing only to send all queries to a front-end service system 91 that is then responsible for contacting the appropriate publisher document-index service system 90. The front-end service system 91 determines the correct publisher to contact on the basis of the ISBN contained in the query, the system 91 having access to a database for mapping between ISBN and publisher and also having an address list giving the address of the system 90 of each publisher.

In the FIG. 7(d) arrangement, all queries are initially sent to the same system 92. This systems serves to ascertain the service-system address for the publisher of the document identified in a query message. System 92 then returns the query message to device 20 with a redirection address set to the publisher's service system address; as a result, the query message is redirected by device 20 to the correct publisher service system.

It will be appreciated that many variants are possible to the above-described embodiments of the invention. Thus, the location of user 70 can be obtained by device 20 (e.g. from location server 67 or from an internal GPS system) and sent to the document-index service system in the query message; this avoids the need for the service system to contact location server 67.

Again, the identity of the document can be disclosed to the service system in the form of the address used for the query message—that is, a part of the message address can be document specific.

Of course, the service system can be arranged to look up a database for further information of relevance to the user's location, this information—or an offer of it—being returned to the user along with the document reference. This further information can, for example, be updates to the document possessed by the user, or other information such as information about current local events.

The service system can, of course, also be used to provide locally-relevant references into an electronic document held by the mobile entity (such as, for example, a guide book purchased on a removable data carrier or previously downloaded over the Internet).

The invention claimed is:

1. A method of finding locally-relevant information in a physical or electronic document already possessed by a user, the method comprising the steps of:
(a) sending a query message from a mobile entity associated with the user via a mobile radio infrastructure to a service system, the query message identifying the document to the system;
(b) providing location data regarding the location of the mobile entity to the service system;
(c) under the control of the service system, obtaining a document reference indicating where, in the document, information can be found that is relevant to the locality of the mobile entity as indicated by said location data;
(d) returning the document reference to the mobile entity.

2. A method according to claim 1, wherein the document is identified to the service system by including its International Standard Book Number (ISBN) number in the query message.

3. A method according to claim 1, wherein the document is identified to the service system by the specific address to which the query message is sent.

4. A method according to claim 1, wherein the user identifies the document to the mobile entity by selecting the document from a list of documents held by the mobile entity and presented to the user via a user interface of the mobile entity, the mobile entity incorporating an identifier of the selected document in the query message.

5. A method according to claim 1, wherein the location of the mobile entity is obtained by the mobile entity and provided to the service system in the query message.

6. A method according to claim 1, wherein the location of the mobile entity is obtained by the service system from a location server of the mobile radio infrastructure.

7. A method according to claim 1, wherein the service system is adapted to handle query messages relating to documents from one publisher only, the mobile entity being operative to send the query message to a service system associated with the publisher of the document concerned.

8. A method according to claim 1, wherein the service system is adapted to handle query messages relating to documents from more than one publisher by having a database system holding location to document-reference information for said more than one publisher.

9. A method according to claim 1, wherein the service system is adapted to handle query messages relating to documents from more than one publisher by accessing further service systems maintained by individual publishers.

10. A method according to claim 1, wherein the query message is initially sent to a re-direction server which returns the message with a redirection address corresponding to a service system associated with the publisher of the document.

11. A method according to claim 1, wherein step (c) involves directly mapping the location data to a document reference.

12. A method according to claim 1, wherein step (c) involves mapping the location data to one or more identified elements associated with the location concerned and then ascertaining occurrences of these elements in the document, the document reference of at least one of these occurrences being returned to the user in step (d).

13. A method according to claim 1, wherein the service system also looks up additional data, not in the document, about the locality of the user and returns, or offers to return, this data to the user.

14. A method according to claim 1, wherein the document already possessed by a user is a physical document.

15. A service system for use in finding locally-relevant information in a physical or electronic document already possessed by a user, the service system comprising:
a communication subsystem for communicating with a mobile entity of the user via a communications infrastructure that includes a mobile radio network with which the mobile entity can communicate;

a query handler for receiving a query message from the mobile entity via the communications infrastructure, the query message identifying the document to the system;

a location-determination arrangement for providing location data regarding the location of the mobile entity; and a document-reference determination subsystem for providing a reference indicative of where, in the identified document, information can be found that is relevant to the locality of the mobile entity as indicated by said location data;

the query handler being operative to return to the mobile entity, via the communications infrastructure, the document reference provided by the document-reference determination subsystem.

16. A service system according to claim 15, wherein the service system is adapted to handle query messages relating to documents from one publisher only.

17. A service system according to claim 15, wherein the service system is adapted to handle query messages relating to documents from more than one publisher by holding location to document-reference information for said more than one publisher.

18. A service system according to claim 15, wherein the service system is adapted to handle query messages relating to documents from more than one publisher by accessing further service systems maintained by individual publishers.

19. A service system according to claim 15, wherein the document-reference determination subsystem is operative to look up in a database a direct mapping of the location data to a document reference.

20. A service system according to claim 15, wherein the document-reference determination subsystem comprises a first conversion arrangement for converting the location data to one or more identified elements associated with the location concerned, and a second conversion arrangement that ascertains occurrences of these elements in the document, the document reference of at least one of these occurrences being returned to the user by the query handler.

21. A service according to claim 15, wherein the document already possessed by the user is a physical document.

* * * * *